(12) United States Patent
Liao

(10) Patent No.: US 11,267,526 B2
(45) Date of Patent: Mar. 8, 2022

(54) STRUCTURE OF KICK SCOOTER

(71) Applicant: HL CORP (SHENZHEN), Shenzhen (CN)

(72) Inventor: Hsueh-Jean Liao, Taipei (TW)

(73) Assignee: HL CORP (SHENZHEN), Shenzhen (CN)

(*) Notice: Subject to any disclaimer, the term of this patent is extended or adjusted under 35 U.S.C. 154(b) by 253 days.

(21) Appl. No.: 16/747,528

(22) Filed: Jan. 21, 2020

(65) Prior Publication Data
US 2020/0298928 A1 Sep. 24, 2020

(30) Foreign Application Priority Data
Mar. 19, 2019 (TW) ................................. 108203275

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
CPC ............................... B60K 3/002; B60K 15/006
See application file for complete search history.

(56) References Cited

U.S. PATENT DOCUMENTS

| | | | | |
|---|---|---|---|---|
| 6,158,751 A * | 12/2000 | Wu | ......................... | B62K 3/002 280/87.041 |
| 6,173,976 B1 * | 1/2001 | Lee | ......................... | B62K 3/002 280/87.041 |
| 6,182,988 B1 * | 2/2001 | Wu | ......................... | B62K 3/002 280/87.041 |
| 6,286,845 B1 * | 9/2001 | Lin | ......................... | B62K 3/002 16/324 |
| 6,305,698 B1 * | 10/2001 | Liang | ..................... | B62K 3/002 280/655.1 |
| 6,332,621 B1 * | 12/2001 | Wu | ......................... | B62K 3/002 16/900 |
| 7,407,172 B2 * | 8/2008 | Ka Ming | ............... | B62K 3/002 280/87.041 |
| 9,950,244 B1 * | 4/2018 | Sargis | ..................... | B60L 50/66 |
| 10,093,380 B2 * | 10/2018 | Gotfrid | .................. | B62K 3/002 |
| 2002/0050696 A1 * | 5/2002 | Lan | ......................... | B62K 3/002 280/87.041 |
| 2002/0096855 A1 * | 7/2002 | Lee | ......................... | B62K 3/002 280/244 |

(Continued)

*Primary Examiner* — Katy M Ebner
(74) *Attorney, Agent, or Firm* — Leong C. Lei

(57) ABSTRACT

A kick scooter includes a deck, an upright tube, and a folding mechanism. The upright tube is mounted by the folding mechanism to the deck. The folding mechanism includes a mounting case mounted on the deck and two connecting arms attached to the upright tube. The mounting case is pivotally mounted to a rocking arm that is provided with a position-restoring preloading force and has a free end to which a moving bar is attached. The two connecting arms are respectively formed with arc guide slots opposite to each other and centered at a pivotal joint to receive a moving bar of the rocking arm to extend therethrough for being guided thereby to move. Each arc guide slot has two ends respectively formed with a folding positioning notch and an expanding positioning notch for selectively positioning the moving bar therein as being biased by the position-restoring preloading force.

9 Claims, 5 Drawing Sheets

(56) References Cited

U.S. PATENT DOCUMENTS

| | | | | |
|---|---|---|---|---|
| 2002/0140193 A1* | 10/2002 | Chai | ................... | B62K 3/002 |
| | | | | 280/87.041 |
| 2005/0073121 A1* | 4/2005 | Chen | ................... | B62K 3/002 |
| | | | | 280/87.05 |
| 2006/0103097 A1* | 5/2006 | Chen | ................... | B62K 3/002 |
| | | | | 280/87.05 |
| 2007/0085289 A1* | 4/2007 | Ming | ................... | B62M 1/00 |
| | | | | 280/87.041 |
| 2009/0230648 A1* | 9/2009 | Chan | ................... | B62K 3/002 |
| | | | | 280/87.041 |
| 2009/0302566 A1* | 12/2009 | Chan | ................... | B62K 3/002 |
| | | | | 280/87.041 |
| 2011/0316247 A1* | 12/2011 | Johnson | ............... | B62K 3/002 |
| | | | | 280/87.05 |
| 2012/0018969 A1* | 1/2012 | Cho | ................... | B62K 3/002 |
| | | | | 280/87.041 |
| 2012/0048636 A1* | 3/2012 | Huang | ................. | B62K 3/002 |
| | | | | 180/220 |
| 2012/0187646 A1* | 7/2012 | Turner | ................ | B62K 15/006 |
| | | | | 280/87.05 |
| 2016/0096576 A1* | 4/2016 | Gotfrid | ............... | B62K 15/006 |
| | | | | 280/641 |
| 2016/0368558 A1* | 12/2016 | Xu | ..................... | B62K 3/002 |
| 2020/0298928 A1* | 9/2020 | Liao | ................... | B62K 3/002 |

\* cited by examiner

STRUCTURE OF KICK SCOOTER

TECHNICAL FIELD OF THE INVENTION

The present invention relates to a technique of folding a kick scooter, and more particularly to a structure of a kick scooter of which an operation of folding is easy so as to achieve effective positioning during fold and use of the kick scooter to thereby enhance convenience and safety of use.

DESCRIPTION OF THE PRIOR ART

A kick scooter is a simple tool for entertainment and transportation. A modern kick scooter comprises a rear wheel assembly mounted to a rear end of a deck, a handlebar rotatably mounted to a front end of the deck by means of an upright tube, and a front wheel assembly mounted to a bottom of the upright tube in order to allow a user to step on the deck with one foot, while another foot pushing the ground surface to push the kick scooter, and to control the front wheel assembly with the handlebar mounted to a top of the upright tube to change a moving direction. However, recently, considering easiness and space requirement for storage and shipping, the kick scooter is often designed to provide the upright tube of the handlebar with a foldable structure, in order to effectively reduce the volume thereof after folding.

However, most of the contemporary folding structure is made by designing the upright tube in a two-sectioned mechanism, with a quick disassembling structure set up at a separating site in order to achieve selective releasing or fix at the separating site. Such a structure is over-simplified so that, when connected, secured coupling may not be effectively achieved to thereby affect safety of operating the kick scooter, and when folded, complete collapse may sometime not be done correctly, leading to being not neat and damaging aesthetics thereof in storage. Further, in both releasing and fixing, the operation is tedious, making the operation difficult and time consuming. The collapse of the entirety of the kick scooter is inconvenient. The folding structure of the known kick scooter is not satisfactory.

SUMMARY OF THE INVENTION

An objective of the present invention is to provide a structure of a kick scooter, which enables folding to be conducted efficiency with an easy operation, so as to provide an effect of operation easiness.

Another objective of the present invention is to provide a structure of a kick scooter, which enables effective positioning during collapse or expansion for use so as to improve convenience of safety of use.

DETAILED DESCRIPTION OF THE PREFERRED EMBODIMENT

Figure 1:
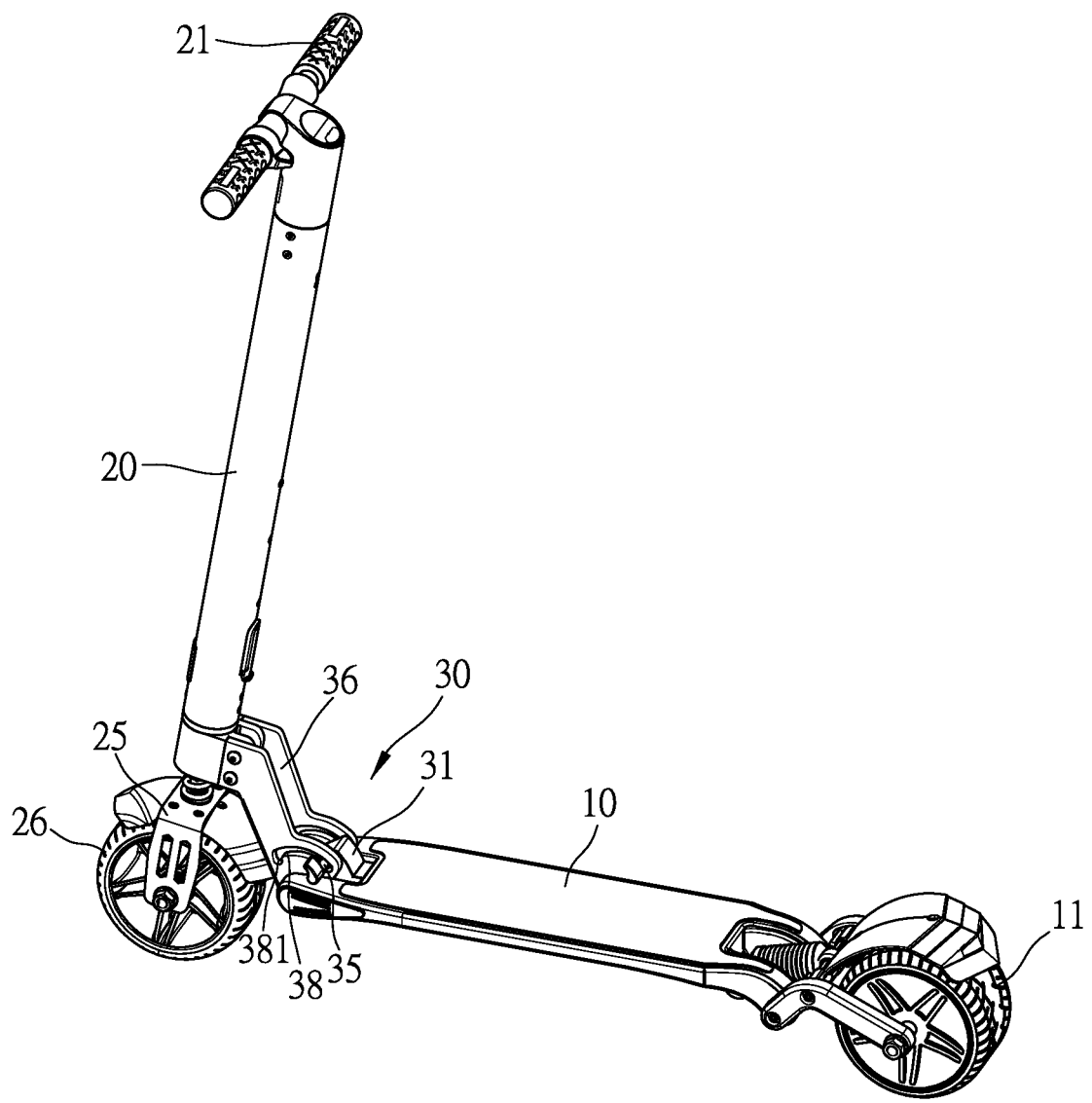
FIG. 1 is a perspective view showing a structure of a kick scooter according to the present invention.
Figure 2:
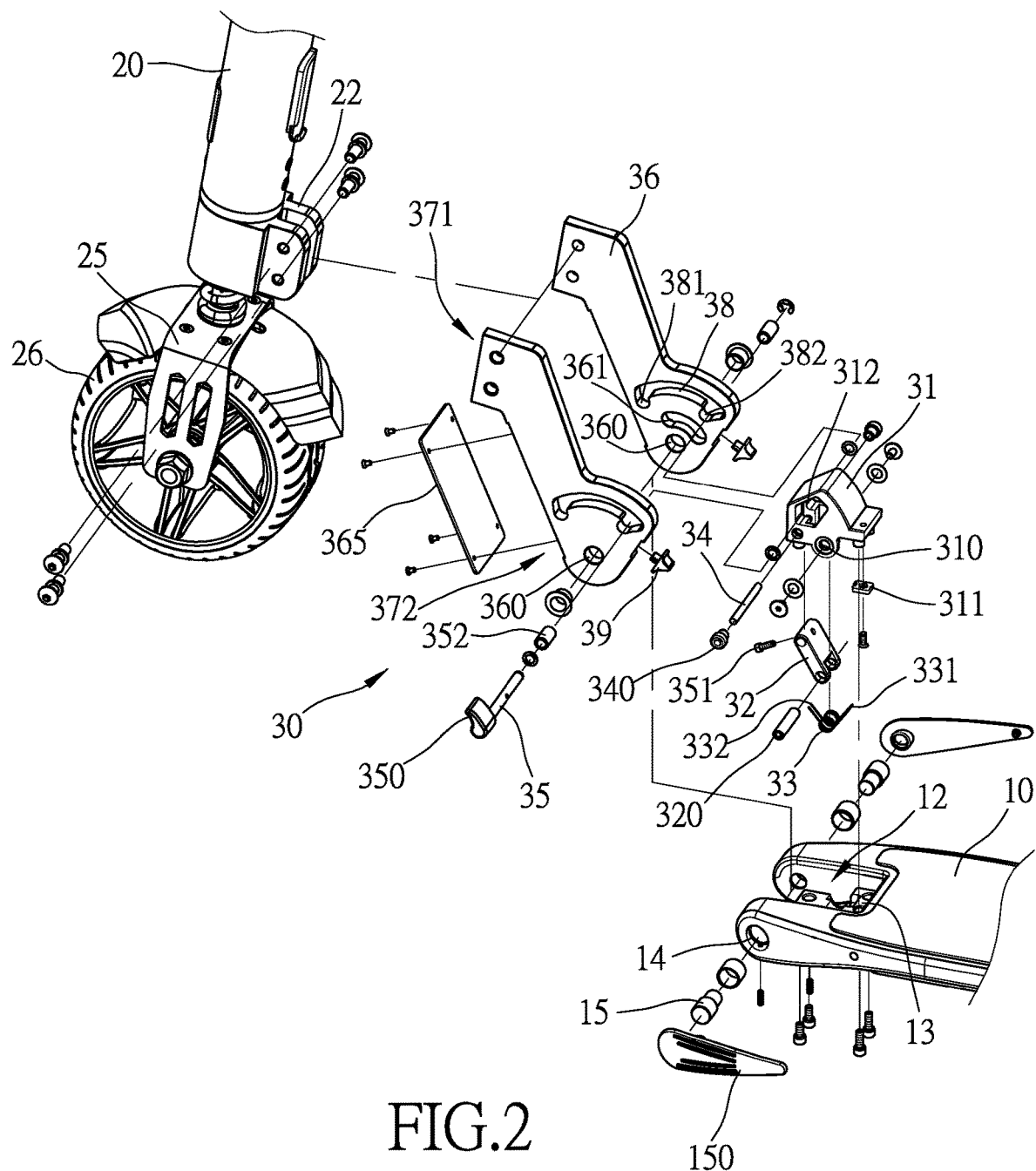
FIG. 2 is an exploded view showing a portion of the structure of the kick scooter according to the present invention, illustrating components constituting a folding mechanism and structural relationships thereof.

Details of construction of a structure of a kick scooter according to the present invention are shown in FIGS. 1 and 2, comprising a deck 10, an upright tube 20, and a folding mechanism 30, wherein the upright tube 20 is mounted by means of the folding mechanism 30 to a front end of the deck 10 to enable, through operation of the folding mechanism 30, selective folding and collapse of the upright tube 20 with respect to the deck 10 thereby achieving effects of easy operation and efficient folding.

Figure 3:
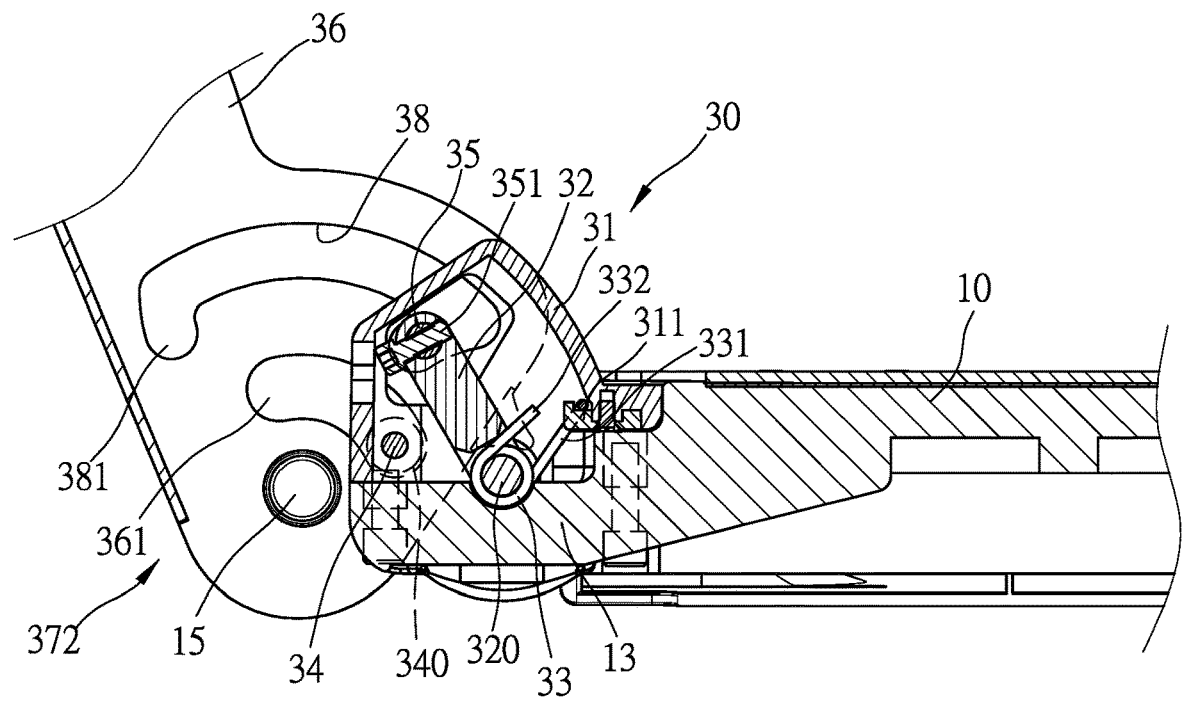
FIG. 3 is a side elevational view, in a sectioned form, showing the folding mechanism of the structure of the kick scooter according to the present invention in an assembled form.
Figure 4:
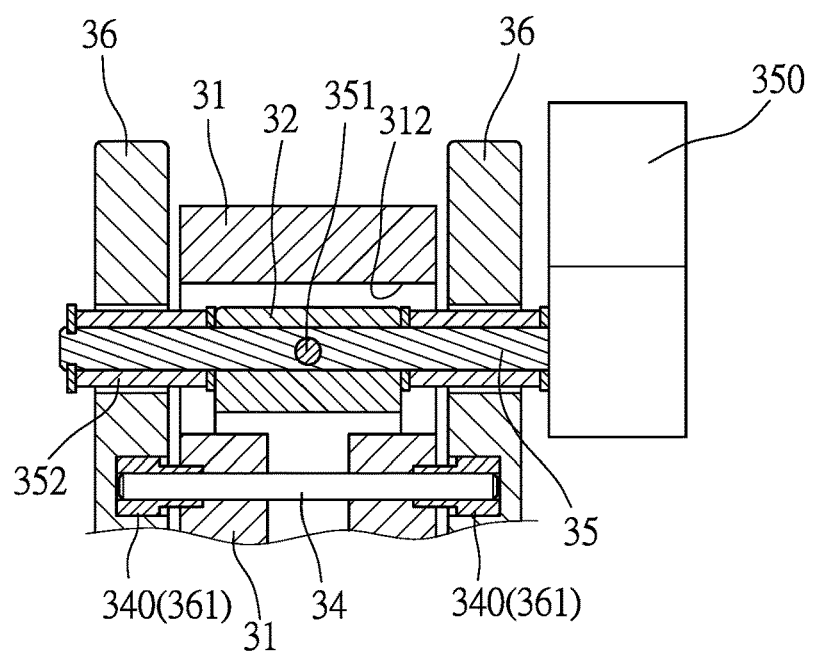
FIG. 4 is a front view, in a sectioned form, showing the folding mechanism of the structure of the kick scooter according to the present invention in the assembled form.

Concerning details of construction of the structure of the kick scooter according to the present invention, further reference is made to what shown in FIGS. 2 and 3, wherein the deck 10 comprises a board on which a user may step. The deck 10 has a rear end to which a rear wheel assembly 11 is mounted. Further, the deck 10 is formed, in the front end thereof, with a mounting notch 12. The mounting notch 12 has a bottom that is provided with a bottom plate 13. Further, the deck 10 is formed, in two opposite side walls of the mounting notch 12, with axle holes 14 that correspond to each other to pivotally connect the folding mechanism 30 with an axle 15. Further, the deck 10 is provided, on two opposite outer surfaces of the front end, with cover plates 150 respectively corresponding to the axle holes 14 to protect the axle 15.

The upright tube 20 is provided, on a top end thereof, with a handlebar 21. Further, the upright tube 20 is provided, in a rotatable manner, on a bottom end thereof, with a front forked frame 25 that is operatively coupled to the handlebar 21. Further, a front wheel assembly 26 is arranged in between the front forked frame 25, so that the handlebar 21 is operable to control the front wheel assembly 26 to change a direction thereof. Further, the upright tube 20 is provided, on an outer surface thereof at a location adjacent to the bottom end, with a vertical fitting housing 22 so that the upright tube 20 may be fixed, through the vertical fitting housing 22, to an end of the folding mechanism 30 that is opposite to the deck 10 to enable selective pivoting and folding of the upright tube 20 relative to the deck 10.

The folding mechanism 30 includes a mounting case 31 and two connecting arms 36, wherein the mounting case 31 is fixed, by means of a plurality of fasteners, on the bottom plate 13 of the mounting notch 12 of the deck 10. Further, the mounting case 31 is formed, in a lower part of a middle thereof, with a penetration hole 310 to allow a rocking arm 32 to be pivotally mounted in the mounting case 31 by a pivot bar 320. Further, the pivot bar 320 is provided, on a middle section thereof, with a torsion spring 33 fit thereon. The torsion spring 33 has two ends that are formed as end pegs 331, 332 extending in the same direction. Further, the two end pegs 331, 332 of the torsion spring 33 are arranged between and respectively supported on the mounting case 31 and the rocking arm 32, so that the rocking arm 32 provides a preloading force for downward position restoration. Further, the mounting case 31 is provided, at a location where the end peg 331 of the torsion spring 33 is supported, with an abutting block 311 that is fixed by a fastener to correspond thereto. Further, the rocking arm 32 has a free end that is provided, in a manner of being arranged in a transverse direction, with a moving bar 35 that extends through the connecting arms 36. Further, an end of the moving bar 35 that projects outside the connecting arms 36 is provided with a push tab 350. Further, the moving bar 35 is fixed, at a middle section thereof, to the rocking arm 32 by means of a fastener 351, so that a user may push the push tab 350 to cause the moving bar 35 to drive the rocking arm 32 to rotate relative to the mounting case 31, and the rocking arm 32 compress the torsion spring 33 to generate a preloading force for restoration. Further, the mounting case 31 is formed with a hollowed trough 312 that corresponds to a moving range of the moving bar 35 of the rocking arm 32. Further, in this invention, the folding mechanism 30 is embodied, in an example, as two connecting arms 36 that are opposite to each other. Each of the connecting arms 36 has two ends that are respectively defined as a fixed end 371 fixed to the upright tube 20 and a pivoting end 372 pivotally connected to the deck 10, wherein the pivoting end 372 of the connecting arm 36 includes an axle hole 360 formed therein to allow the connecting arm 36 to be pivotally connected by receiving the axle 15 of the deck 10 to extend through the axle holes 14, 360, so that the upright tube 20 that is fixed to an opposite end of the connecting arm 36 to selectively fold with respect to the deck 10. Further, the connecting arms 36 that are arranged on two opposite sides are respectively formed with arc guide slots 38 that are opposite to each other and are centered at an axis defined by the axle holes 360 to receive extension of the moving bar 35 of the rocking arm 32 therethrough for guiding movement thereof along the curves. Further, the moving bar 35 has two ends are respectively fit, in a rotatable manner, rollers 352 that are opposite to each other. Further, each of the arc guide slots 38 has two ends respectively including a folding positioning notch 381 and an expanding positioning notch 382 in communication therewith and curving further in a downward direction, so that when the moving bar 35 is moved with the rocking arm 32 to reach the folding positioning notch 381 or the expanding positioning notch 382, the rocking arm 32 is acted upon by the preloading restoration force of the torsion spring 33 and causes the roller 352 of the moving bar 35 to move into the folding positioning notch 381 or the expanding positioning notch 382, and, without being acted externally for being pushed out thereof, the moving bar 35 is prevented from entering back the arc guide slots 38 of the connecting arms 36 for further movement, and as such, an effect of positioning is achieved. Further, in some embodiments, the mounting case 31 is provided with a push bar 34 extending through a front end thereof. Further, the push bar 34 has two ends each including a rotor 340 mounted thereto. The connecting arms 36 that are arranged on the opposite sides have surfaces that face each other and are respectively formed with un-penetrating arc slots 361 that are opposite each other, so that the pivoting ends 372 of the connecting arms 36 on the two opposite sides are prevented from undesirably approaching each other to thereby ensure smoothness of operations of folding and expanding. According to some embodiments, the connecting arms 36 that are arranged on the opposite sides are provided with a protection plate 365 therebetween on bottoms thereof in order to provide effects of protection and dust resistance.

Further according to some embodiments, the connecting arms 36 that are arranged on the opposite sides are each provided with a supporting pad 39 at a flange thereof that faces the ground after folding for the purposes of contacting and supporting on the ground to allow the kick scooter to be positioned flat on the ground.

Figure 5:
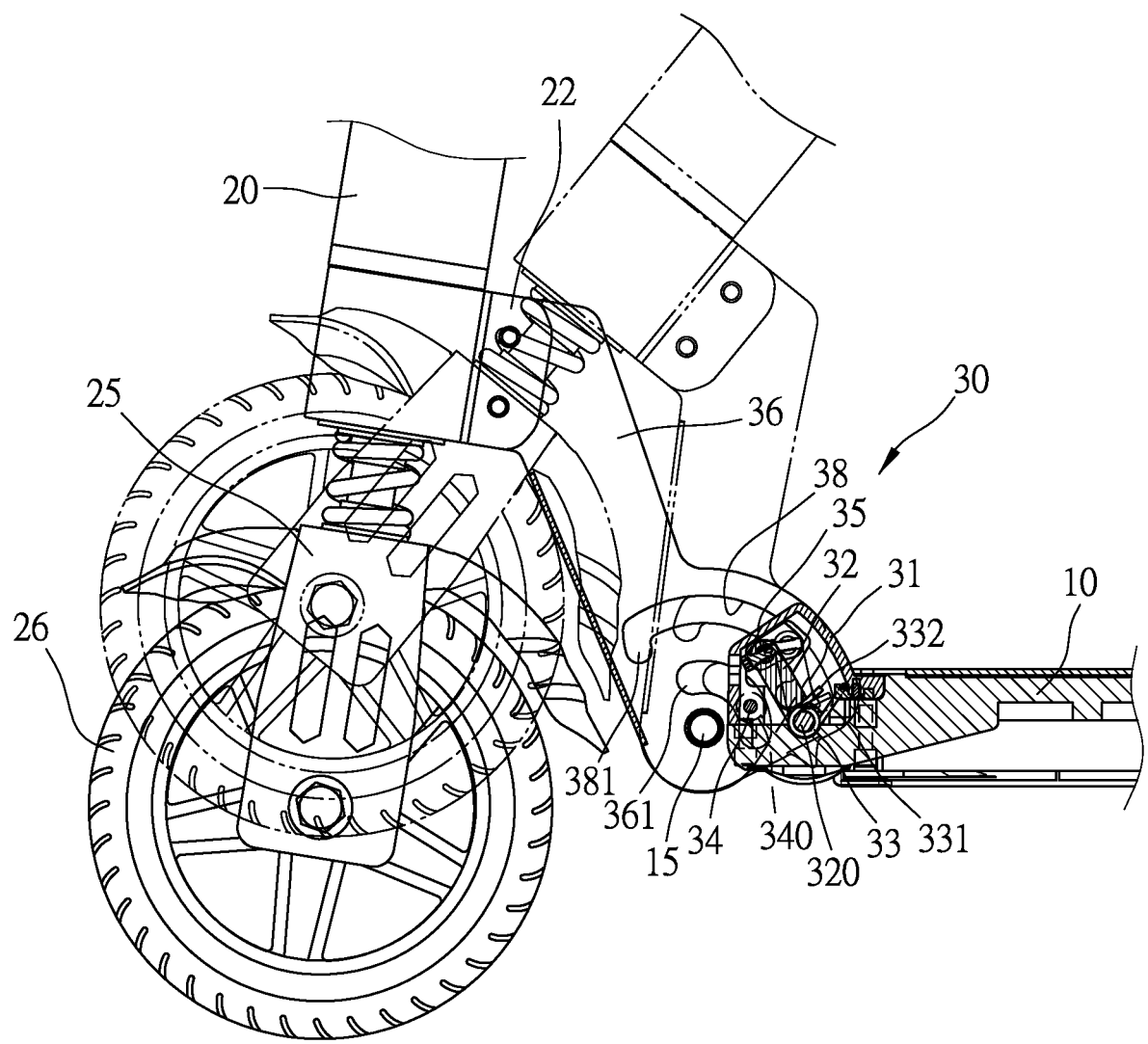
FIG. 5 is a side elevational view, in a sectioned form, showing the folding mechanism of the structure of the kick scooter according to the present invention in an expanded, usable state, illustrating conditions before and after expansion.

With the above structural arrangement, operation of the present invention can be conducted as shown in FIGS. 1, 3, and 5. In a condition of normal use, the upright tube 20 is rotated, for being erected to expand, relative to the deck 10, which is generally set horizontally, by means of the connecting arms 36 of the folding mechanism 30, so that the arc guide slots 38 of the connecting arms 36 of the folding mechanism 30 are moved relative to the mounting case 31 that is mounted on the deck 10 to the expanding positioning notches 382, and the rocking arm 32 of the mounting case 31 drives the rollers 352 of the moving bar 35 to fit into and get engagement with the expanding positioning notches 382 of the arc guide slots 38 of the connecting arms 36 to thereby restrict the moving bar 35 therein and being prevented from moving back into the arc guide slots 38. This sets the connecting arms 36 and the upright tube 20 in a condition as being positioned in an expanded state, allowing a user to operate and use the kick scooter. In an attempt to get released from the expanded state for folding or collapse, the user uses the push tab 350 to push the moving bar 35 out of the expanding positioning notches 382 for disengagement therefrom to enter back the arc guide slots 38. This would allow the upright tube 20 to act on and drive the connecting arms 36 of the folding mechanism 30 to rotate relative to the mounting case 31 for folding or collapse and subsequently, the upright tube 20 can be further rotated for folding to eventually stack on the deck 10 (as shown in FIG. 6).

Figure 6:
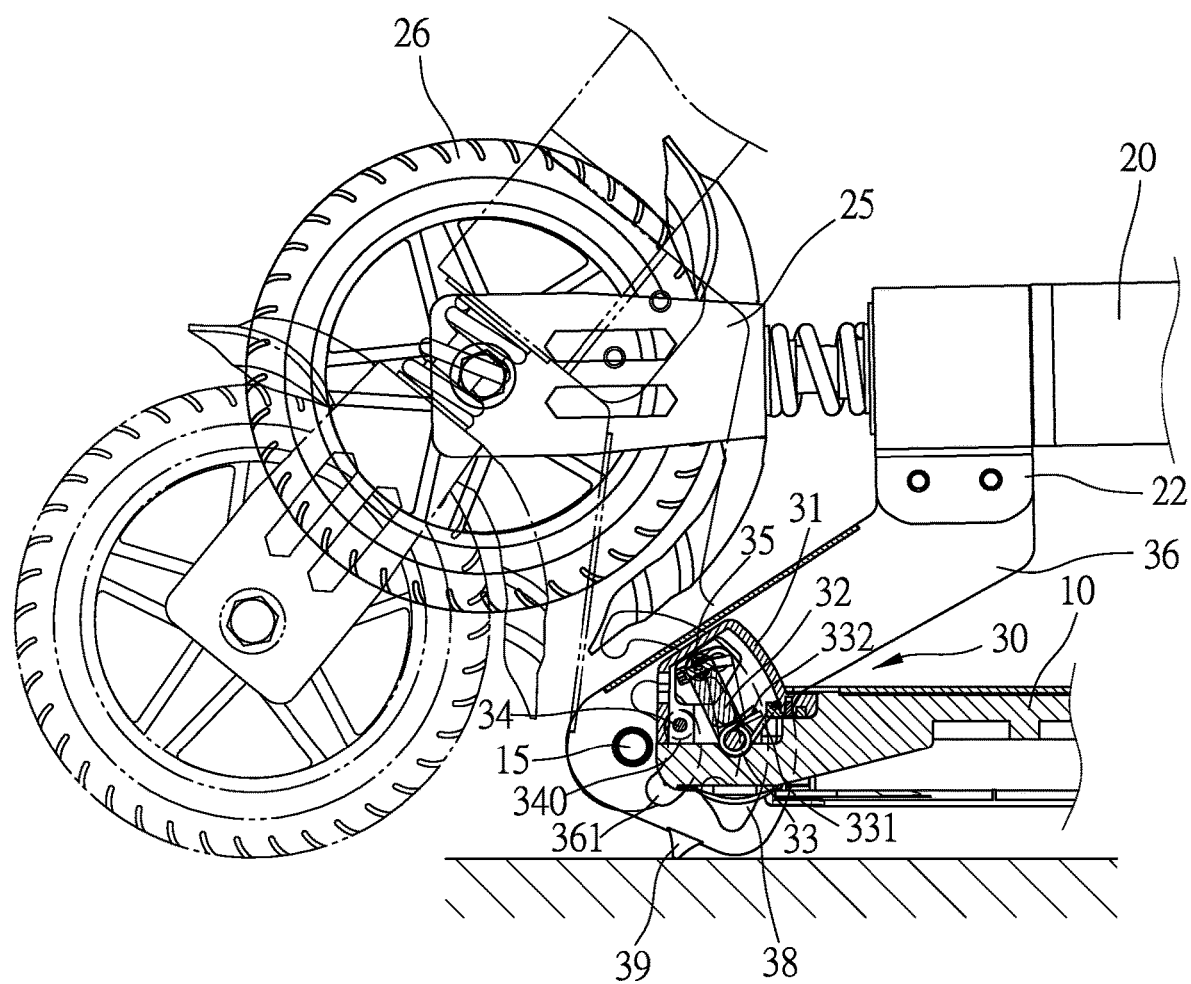
FIG. 6 is a side elevational view, in a sectioned form, showing the folding mechanism of the structure of the kick scooter according to the present invention in a folded state, illustrating conditions before and after folding.

In a condition that the upright tube 20 is in a folded state and stacked on the deck 10, as shown in FIG. 6, the arc guide slots 38 of the connecting arms 36 of the folding mechanism 30 are movable relative to the mounting case 31 that is mounted on the deck 10 to reach the folding positioning notches 381, and the rocking arm 32 of the mounting case 31 drives the rollers 352 of the moving bar 35 to fit into and get engagement with the folding positioning notches 381 of the arc guide slots 38 of the connecting arms 36 to thereby restrict the moving bar 35 therein and being prevented from moving back into the arc guide slots 38. This sets the connecting arms 36 and the upright tube 20 in a condition as being positioned in a folded state to thereby achieve easy operation and efficient folding. Further, in an attempt to get released from the folded state for expansion to use, the user may use the push tab 350 to push the moving bar 35 out of the folding positioning notches 381 for disengagement therefrom to enter back the arc guide slots 38. This would allow the upright tube 20 to act on and drive the connecting arms 36 of the folding mechanism 30 to rotate relative to the mounting case 31 for expansion and subsequently, the upright tube 20 can be further rotated for expansion to eventually stand up on the deck 10 for use (as shown in FIG. 5).

It is appreciated from the above descriptions concerning the structural arrangement and operation thereof that the structure of the kick scooter provided in the present invention can be selectively folded to effectively reduce the size of the kick scooter for easy storage and shipping, and is also structured to provide an excellent effect of positioning to prevent undesired change of a state thereof during any use thereby enhancing safety of use and further ensuring effects of easy operation and efficient collapse to thus greatly improve utilization thereof.

I claim:

1. A structure of the kick scooter, comprising:
a deck, which has an end that is mounted with a rear wheel assembly, an opposite end of the deck being formed with a mounting notch;
an upright tube, which has a top end to which a handlebar is pivotally mounted, the upright tube having a bottom end that is mounted with a front wheel assembly operatively coupled with the handlebar; and
a folding mechanism, which comprises a mounting case and two connecting arms, the mounting case being mounted in the mounting notch of the deck, the mounting case being provided with a rocking arm that is pivotally mounted therein, the rocking arm and the mounting case being provided therebetween with a torsion spring that provides a position-restoring preloading force to the rocking arm, the rocking arm having a free end that is fixedly mounted with a moving bar, the two connecting arms each having two ends that are respectively formed as a fixed end that is fixedly mounted to the upright tube and a pivoting end that is pivotally jointed to the deck, the connecting arms being arranged at two opposite sides and being respectively formed with arc guide slots that are opposite to each other and centered at the pivotal joint to receive the moving bar of the rocking arm to extend therethrough and to be guided to move along the arcs, each of the arc guide slots having two ends respectively provided with a folding positioning notch and an expanding positioning notch in communication therewith and curving further downward.

2. The structure of the kick scooter according to claim 1, wherein the deck comprises a bottom plate arranged at a bottom of the mounting notch, and the mounting case is mounted, by means of a plurality of fasteners, to the bottom plate of the mounting notch of the deck, and wherein the deck is provided with axle holes that are respectively formed in opposite side walls of the mounting notch and are opposite to each other and the connecting arms of the folding mechanism are each provided with an axle hole formed in the pivoting end thereof and corresponding thereto to allow the deck and the connecting arms of the folding mechanism to pivotally couple to each other with an axle.

3. The structure of the kick scooter according to claim 1, wherein the front wheel assembly of the upright tube is mounted to a front forked frame, and the handlebar is operable to control the front forked frame to drive the front wheel assembly to change a direction thereon.

4. The structure of the kick scooter according to claim 1, wherein the mounting case of the folding mechanism is formed, in a bottom end of a middle portion thereof, with a penetration hole, which allows the rocking arm to be pivotally mounted in the mounting case by a pivot bar, and the pivot bar is fit with a torsion spring, the torsion spring having two ends that are formed as end pegs, respectively, projecting in a same direction, the two end pegs of the torsion spring being arranged between and respectively supported on the mounting case and the rocking arm.

5. The structure of the kick scooter according to claim 4, wherein the mounting case is provided, at a location where one of the end pegs of the torsion spring is supported thereon, with an abutting block that is fixed by a fastener to correspond thereto.

6. The structure of the kick scooter according to claim 1, wherein the moving bar of the mounting case of the folding mechanism has an end projecting outside the connecting arms and formed with a push tab, and the moving bar is fixed, at a middle section thereof, to the rocking arm by a fastener, the moving bar being provided with a roller corresponding to the arc guide slot of each of the connecting arms.

7. The structure of the kick scooter according to claim 1, wherein the mounting case of the folding mechanism is provided with a push bar extending through a front end thereof, and the push bar has two ends each comprising a rotor mounted thereto, the connecting arms that are arranged at two opposite sides having surfaces that face each other and are respectively formed with un-penetrating arc slots.

8. The structure of the kick scooter according to claim 1, wherein the connecting arms that are arranged at two opposite sides of the folding mechanism are each provided with a supporting pad at a flange thereof that faces the ground after folding.

9. The structure of the kick scooter according to claim 1, wherein the upright tube is mounted with a vertical fitting housing on an outer surface thereof at a location adjacent to the bottom end thereof, and the upright tube is fixed, through the vertical fitting housing, to a fixed end of each of the connecting arms of the folding mechanism.

* * * * *